(12) United States Patent
O'Hare et al.

(10) Patent No.: US 11,144,206 B2
(45) Date of Patent: Oct. 12, 2021

(54) METHOD AND SYSTEM FOR SHARING DATA REDUCTION METADATA WITH STORAGE SYSTEMS

(71) Applicant: EMC IP Holding Company LLC, Hopkinton, MA (US)

(72) Inventors: Jeremy O'Hare, Westborough, MA (US); Alexandre Lemay, Deux-Montagnes (CA); Matthew Fredette, Belmont, MA (US); Sorin Faibish, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 26 days.

(21) Appl. No.: 16/671,584

(22) Filed: Nov. 1, 2019

(65) Prior Publication Data
US 2021/0132814 A1 May 6, 2021

(51) Int. Cl.
*G06F 3/06* (2006.01)
*G06F 16/174* (2019.01)

(52) U.S. Cl.
CPC .......... *G06F 3/0608* (2013.01); *G06F 3/0655* (2013.01); *G06F 3/0674* (2013.01); *G06F 3/0679* (2013.01); *G06F 16/1748* (2019.01); *G06F 2213/0036* (2013.01)

(58) Field of Classification Search
CPC .......................... G06F 3/0608; G06F 16/1748
See application file for complete search history.

(56) References Cited

U.S. PATENT DOCUMENTS

| | | | | |
|---|---|---|---|---|
| 2010/0180072 A1* | 7/2010 | Kogita | ................ | G06F 12/0246 711/103 |
| 2012/0150954 A1* | 6/2012 | Tofano | .................. | G06F 9/5066 709/204 |
| 2016/0224599 A1* | 8/2016 | Sherry | .................... | G06F 16/48 |
| 2018/0060183 A1* | 3/2018 | Fagiano | ............. | G06F 11/1453 |
| 2019/0012091 A1* | 1/2019 | Floyd | ..................... | G06F 3/0641 |
| 2020/0356292 A1* | 11/2020 | Ippatapu | ............... | G06F 3/0608 |

* cited by examiner

*Primary Examiner* — Edward J Dudek, Jr.
(74) *Attorney, Agent, or Firm* — Chamberlain, Hrdlicka, White, Williams & Aughtry

(57) ABSTRACT

A method and system for sharing data reduction metadata with storage systems. Specifically, the disclosed method and system entail communicating, to a storage system, information known to host devices from which data (submitted to-be-written to the storage system) may originate. This a priori reduction-pertinent information, which may include the potential to improve storage system efficiency and/or performance at least with respect to data reduction processing of the data submitted to-be-written, had previously been considered incommunicable to the storage system. The disclosed method and system, however, lift this previous limitation and enable communication of any storage system performance-improving information, applicable to the data submitted to-be-written, to the storage system.

15 Claims, 4 Drawing Sheets

METHOD AND SYSTEM FOR SHARING DATA REDUCTION METADATA WITH STORAGE SYSTEMS

BACKGROUND

Data reduction is becoming a critical factor in improving the efficiency of storage arrays. Presently, data reduction may be substantively achieved using two different methods: data compression and data deduplication.

SUMMARY

In general, in one aspect, the invention relates to a method for data transfer. The method includes intercepting data intended to be stored on a storage system, obtaining reduction-pertinent metadata for the data, encoding the data, based on an interface connection protocol, to obtain a set of connection protocol datagrams, incorporating, into at least a subset of the set of connection protocol datagrams, the reduction-pertinent metadata to obtain a set of augmented connection protocol datagrams, and transmitting the set of augmented connection protocol datagrams to the storage system.

In general, in one aspect, the invention relates to a non-transitory computer readable medium (CRM) that includes computer readable program code, which when executed by a computer processor, enables the computer processor to intercept data intended to be stored on a storage system, obtain reduction-pertinent metadata for the data, encode the data, based on an interface connection protocol, to obtain a set of connection protocol datagrams, incorporate, into at least a subset of the set of connection protocol datagrams, the reduction-pertinent metadata to obtain a set of augmented connection protocol datagrams, and transmit the set of augmented connection protocol datagrams to the storage system.

In general, in one aspect, the invention relates to a host device that includes a computer processor, a reduction metadata detector, and a host operating system executing on the computer processor, wherein the reduction metadata detector, in concert with the host operating system at least in part, is programmed to: intercept data intended to be consolidated, obtain reduction-pertinent metadata for the data, encode the data, based on an interface connection protocol, to obtain a set of connection protocol datagrams, incorporate, into at least a subset of the set of connection protocol datagrams, the reduction-pertinent metadata to obtain a set of augmented connection protocol datagrams, and transmit the set of augmented connection protocol datagrams for consolidation.

Other aspects of the invention will be apparent from the following description and the appended claims.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1A-3, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and a first element may encompass more than one element and succeed (or precede) the second element in an ordering of elements.

In general, embodiments of the invention relate to a method and system for sharing data reduction metadata with storage systems. Specifically, one or more embodiments of the invention entails communicating, to a storage system, information known to host devices from which data (submitted to-be-written to the storage system) may originate. This a priori reduction-pertinent information, which may include the potential to improve storage system efficiency and/or performance at least with respect to data reduction processing of the data submitted to-be-written, had previously been considered incommunicable to the storage system. Embodiments of the invention, however, lift this previous limitation and enable communication of any storage system performance-improving information, applicable to the data submitted to-be-written, to the storage system.

Figure 1A:
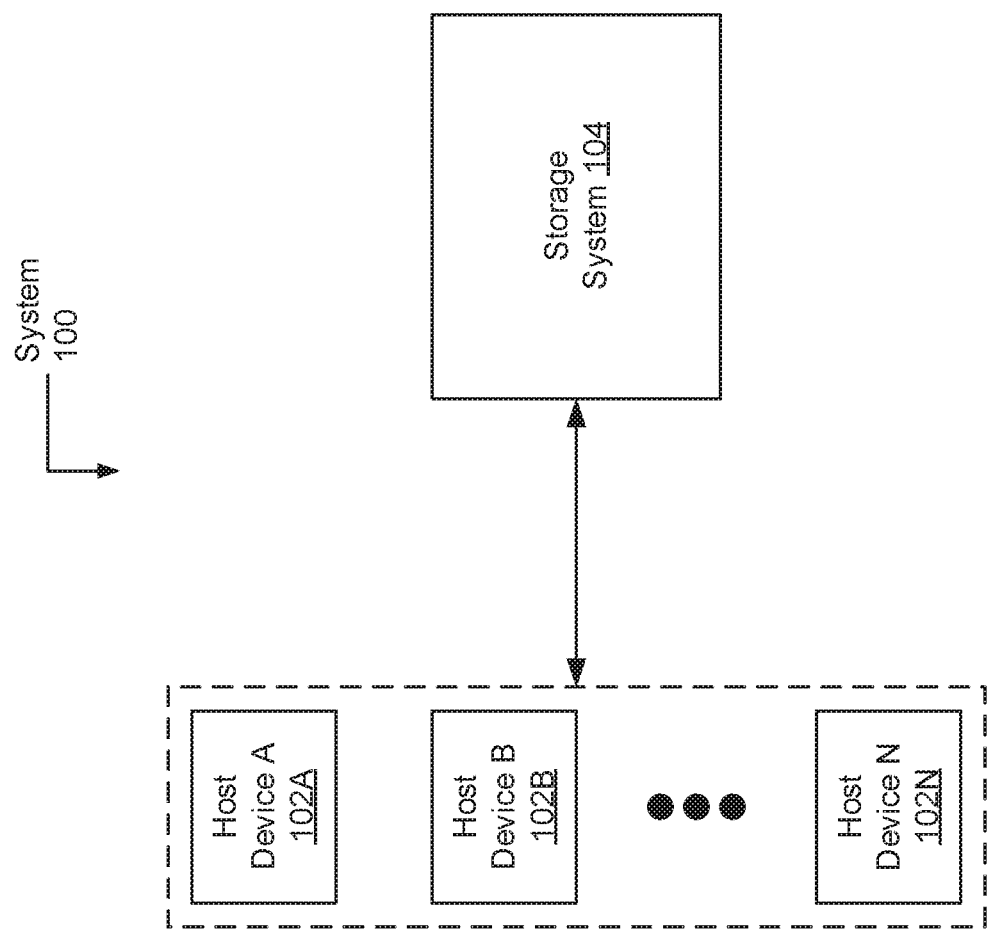
FIG. 1A shows a system in accordance with one or more embodiments of the invention.

FIG. 1A shows a system in accordance with one or more embodiments of the invention. The system (100) may include one or more host devices (102A-102N) operatively connected to a storage system (104). Each of these system (100) components is described below.

In one embodiment of the invention, the above-mentioned system (100) components may operatively connect to one another through a network (not shown) (e.g., a local area network (LAN), a wide area network (WAN) such as the Internet, a mobile network, any other network type, or a combination thereof). The network may be implemented using any combination of wired and/or wireless connections. Further, the network may encompass various interconnected, network-enabled components (e.g., switches, routers, gateways, etc.) that may facilitate communications between the above-mentioned system (100) components.

Moreover, the above-mentioned system (100) components may communicate with one another using any combination of wired and/or wireless communication protocols.

In one embodiment of the invention, a host device (102A-102N) may represent any physical computing system designed and configured to receive, generate, process, store, and/or transmit data, as well as to provide an environment in which one or more computer programs (not shown) may execute thereon. The computer program(s) may, for example, implement large-scale and complex data processing; or implement one or more services offered locally or over the network. Further, in providing an execution environment for the computer program(s) installed thereon, a host device (102A-102N) may include and allocate various resources (e.g., computer processors, memory, storage, virtualization, network bandwidth, etc.), as needed, to the computer program(s) and the task(s) (process(es)) instantiated thereby. One of ordinary skill will appreciate that a host device (102A-102N) may perform other functionalities without departing from the scope of the invention. Examples of a host device (102A-102N) may include, but are not limited to, a desktop computer, a workstation computer, a server, a mainframe, or any other computing system similar to the exemplary computing system shown in FIG. 3. Moreover, any host device (102A-102N) is described in further detail below with respect to FIG. 1B.

In one embodiment of the invention, the storage system (104) may represent an intelligence-managed collection of physical storage devices (not shown) for consolidating any data pertinent to the host device(s) (102A-102N). The storage system (104) may be implemented using one or more servers (not shown). Each server may reflect a physical server, which may reside in a datacenter, or a virtual server, which may reside in a cloud computing environment. Additionally or alternatively, the storage system (104) may be implemented using one or more computing systems similar to the exemplary computing system shown in FIG. 3.

In one embodiment of the invention, each above-mentioned physical storage device, of the storage system (104), may encompass non-transitory computer readable storage media on which data may be stored in whole or in part, and temporarily or permanently. Further, each physical storage device may be designed and configured based on a common or different storage device technology—examples of which may include, but are not limited to, flash based storage devices, fibre-channel (FC) based storage devices, serial-attached small computer system interface (SCSI) (SAS) based storage devices, and serial advanced technology attachment (SATA) storage devices. Moreover, any subset of the physical storage device(s) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, the storage system (104) may include computer programs or processes (not shown) executing thereon, which may be responsible for effecting data reduction algorithms on any subset of data consolidated thereon. Data reduction may include, but is not limited to, data deduplication and data compression. With respect to reducing the volume of data, data compression may operate by identifying redundancy within the bounds of a single data file and, subsequently, removing those redundancies from the single data file. Conversely, data deduplication may operate by identifying redundancy across a collection of data files and, subsequently, removing those redundancies from across the collection of data files.

While FIG. 1A shows a configuration of components, other system (100) configurations may be used without departing from the scope of the invention. For example, in one embodiment of the invention, the system (100) may further include one or more additional storage systems (not shown) operatively connected to the host device(s) (102A-102N). In another embodiment of the invention, the system (100) may further include a backup storage system (not shown) operatively connected to the storage system (104), which may serve as data backup, archiving, and/or disaster recovery storage for data consolidated in the storage system (104).

Figure 1B:
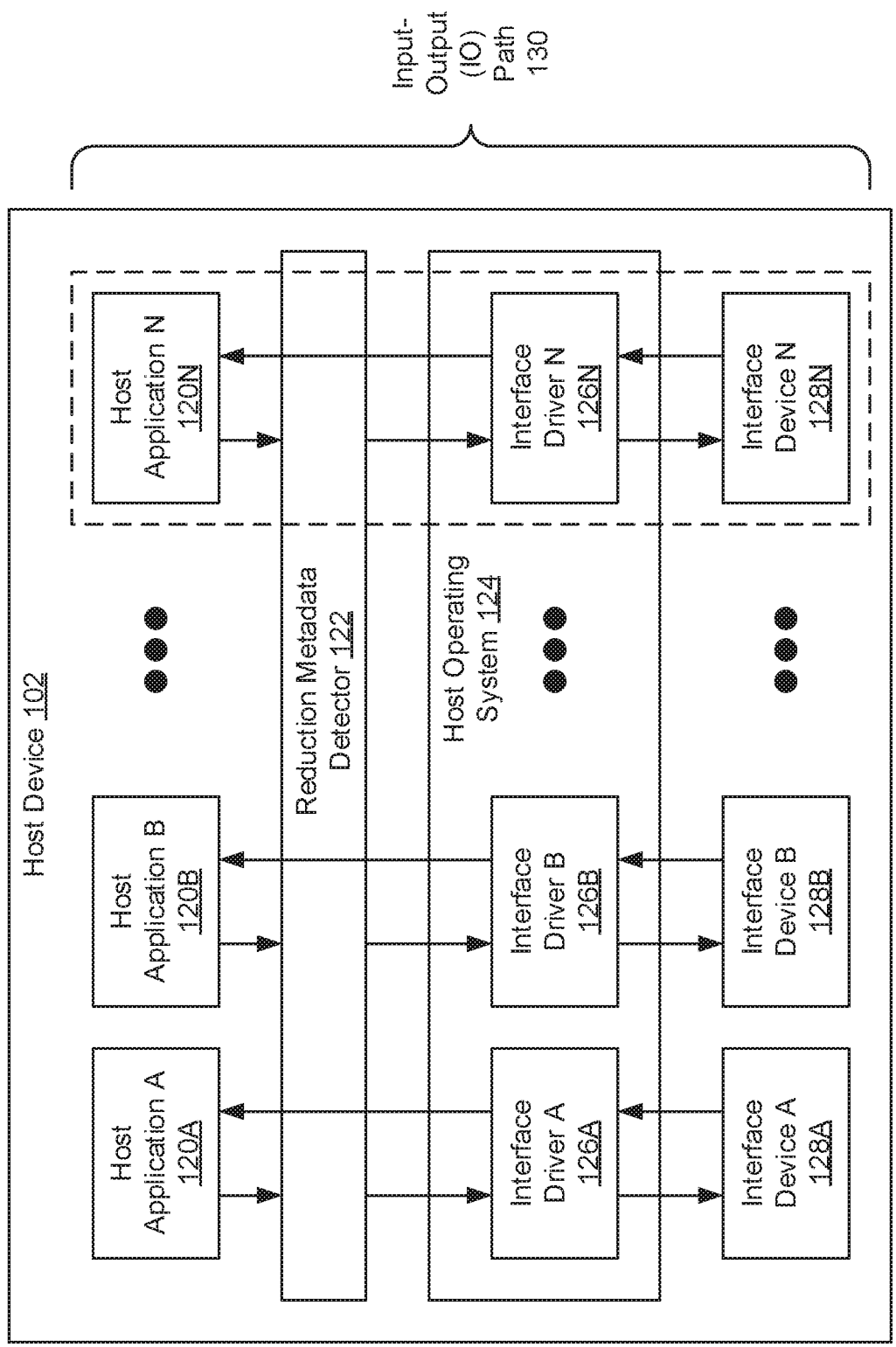
FIG. 1B shows a host device in accordance with one or more embodiments of the invention.

FIG. 1B shows a host device in accordance with one or more embodiments of the invention. The host device (102) may include one or more host applications (120A-120N), a reduction metadata detector (122), a host operating system (124), and one or more interface devices (128A-128N). Each of these host device (102) subcomponents is described below.

In one embodiment of the invention, a host application (120A-120N) may refer to a computer program that may execute on the underlying hardware of the host device (102). Specifically, a host application (120A-120N) may perform one or more functions, tasks, and/or activities directed to instantiating and/or supporting user-defined workloads on the host device (102). Towards performing these aforementioned operations, a host application (120A-120N) may include functionality to request for and consume host device (102) resources (e.g., computing, memory, storage, virtualization, network bandwidth, etc.) to and allocated by the host operating system (124). A host application (120A-120N) may include further functionality to read and write data (e.g., data files, data blocks, etc.) to and from the storage system (see e.g., FIG. 1A), respectively. One of ordinary skill will appreciate that a host application (120A-120N) may perform other functionalities without departing from the scope of the invention. Examples of a host application (120A-120N) may include, but are not limited to, a word processor, an email client, a database client, a web browser, a media player, a file viewer, an image editor, a computer simulator, a computer game, etc.

In one embodiment of the invention, the reduction metadata detector (122) may refer to a computer program that may execute on the underlying hardware of the host device (102). Specifically, the reduction metadata detector (122) may be responsible for sharing data reduction metadata (also referred to as reduction-pertinent metadata) with the storage system (see e.g., FIG. 1A). To that extent, and working alongside the host operating system (124) at least in part, the reduction metadata detector (122) may include functionality to perform the various steps outlined below with respect to FIG. 2. Substantively, the reduction metadata detector (122) may enable the communication of reduction-pertinent metadata, alongside data intended to be written, to the storage system. Sharing of the reduction-pertinent metadata (described below), with the storage system, may improve the management, and data reduction (e.g., data deduplication and/or data compression) processing, of the data intended for consolidation on the storage system, thereby improving overall storage system efficiency. One of ordinary skill will appreciate that the reduction metadata detector (122) may perform other functionalities without departing from the scope of the invention.

In one embodiment of the invention, reduction-pertinent metadata may refer to host device known information capable of swaying (e.g., improving) storage system efficiency and/or performance. Host device known information (also referred to as performance-improving information) may include, but is not limited to, information describing: the host device environment, a host application from which data may have originated, and the data being submitted to the storage system for consolidation. Further, traditionally, without embodiments of the invention, the aforementioned host device known information is presently incommunicable to the storage system. By having the aforementioned a priori information however, the storage system may behave and execute certain processes, such as algorithms directed to data reduction, more efficiently.

In one embodiment of the invention, host device known information that may be of benefit to processes executing on the storage system may include, but is not limited to: information indicating whether the to-be-written data is dedupable or capable of redundancy elimination through data deduplication; information indicating whether the to-be-written data is compressible or capable of redundancy elimination through data compression; information indicating whether the to-be-written data is relatable to any other data previously written into the storage system; information disclosing configuration and/or operational parameters defining a data deduplication or data compression algorithm to be employed; information indicating whether the to-be-written data represents temporary data, which should not be processed by way of data reduction algorithms; information disclosing that the to-be-written data exhibits data chunks that pre-exist on the storage system (for data reduction purposes); information indicating a content type (e.g., text, video, audio, image, etc.) associated with the to-be-written data; and information disclosing a host operating system allocation unit size or a data offset, which may be specific to host operating system (124) executing on the host device (102). The host device known information may be of benefit to processes executing on the storage system in that the information may reduce the input output operations (IOPs) between the host device and the storage system, thus improving the data transfer rate.

In one embodiment of the invention, the above-mentioned operating system allocation unit size (also referred to as a cluster or data block size) may refer to a smallest unit of memory and/or disk storage that may be used to represent and store any data (e.g., any data file) accessible by the logical components (i.e., host application(s) (120A-120N), host operating system (124), reduction metadata detector (122), etc.) of a physical computing system (e.g., a host device (102), the storage system (104), etc.). Further, the operating system allocation unit size may be operating system dependent, and may conform to fixed-block architecture. That is, different operating systems executing on different physical computing systems, or even the same physical computing system, may organize and access data contingent on different operating system allocation unit sizes.

In one embodiment of the invention, the host operating system (124) may refer to a computer program that may execute on the underlying hardware of the host device (102). Specifically, the host operating system (124) may be responsible for managing the utilization of host device (102) hardware—e.g., the interface device(s) (128A-128N)—by the various logical (or software) components (e.g., the host application(s) (120A-120N) and/or the reduction metadata detector (122)) of and executing on the host device (102).

Accordingly, by way of examples, the host operating system (124) may include functionality to: support fundamental host device (102) functions; schedule tasks; allocate host device (102) resources; execute or invoke other computer programs or processes (e.g., utilities, background services, etc.); and control any hardware installed on the host device (102). Host device (102) hardware may refer to any physical and/or tangible component of the host device (102) that includes at least a circuit board, an integrated circuit, or any other electronic logic.

In one embodiment of the invention, towards managing the utilization of, and controlling, any host device (102) hardware, the host operating system (124) may include further functionality to maintain and invoke one or more device drivers—e.g., one or more interface drivers (126A-126N). Generally, a device driver may refer to computer readable program code (or instructions), which when executed by the host operating system (124), enables the host operating system (124), on behalf of itself and/or other logical host device (102) components, to interact with and control a given hardware device installed on the host device (102). Accordingly, an interface driver (126A-126N) may represent instructions that enables interaction and control of a given interface device (128A-128N) installed on the host device (102).

In one embodiment of the invention, an interface device (128A-128N) may refer to host device (102) hardware (described above) purposed with providing input-output (IO) processing and physical connectivity between the host device (102) and the storage system (see e.g., FIG. 1A). IO processing may include, but is not limited to, data encoding and decoding according to one or more interface connection protocols that may be employed by the interface device (128A-128N); and transmitting and receiving connection protocol datagrams (e.g., protocol data units), defined by the interface connection protocol(s), to and from the storage system, respectively. Examples of an interface device (128A-128N) may include, but are not limited to, a host controller, a host adapter, and a host bus adapter (HBA).

In one embodiment of the invention, an interface connection protocol may refer to a standard for connecting and transferring data between the host device (102) and the storage system. The interface connection protocol may define a specification or format for connection protocol datagrams (described below), which may be exchanged between the host device (102) and the storage system to implement the aforementioned transfer of data. By way of examples, the interface connection protocol employed by the interface device(s) (128A-128N) may include, but are not limited to, the small computer system interface (SCSI) protocol, the fibre-channel protocol (FCP), the serially attached SCSI (SAS) protocol, the universal serial bus (USB) attached SCSI (UAS) protocol, the Internet SCSI (iSCSI) protocol, the SCSI remote direct memory access (RDMA) protocol (SRP), the SCSI parallel interface (SPI) protocol, the iSCSI extension for RDMA (iSER), etc.

In one embodiment of the invention, a connection protocol datagram may represent a protocol data unit (PDU), or a single unit of information that may be exchanged between peer entities (e.g., the host device (102) and the storage system) communicating with one another using a given interface connection protocol (described above). Any given interface connection protocol may define any number of commands (e.g., a read command, a write command, a delete command, a query command, get-status command, etc.) and, accordingly, any number of responses including information pertinent to, or sought by, any subset of these commands. Further, these commands and responses may each be propagated between the peer entities using one or more connection protocol datagrams.

In one embodiment of the invention, each connection protocol datagram may include command information, data information, or both. That is, depending on the interface connection protocol, the propagation of information may be segregated into command datagrams (substantively including command information) and data datagrams (substantively including data information) or, alternatively, the propagation of information may be integrated into integral datagrams, each of which may substantively include both command and data information.

In one embodiment of the invention, the term "substantively", used herein, may highlight that any given connection protocol datagram may not solely include command and/or data information. That is, any given connection protocol datagram may further include header information, which may refer to protocol-specific information necessary for the configuration and/or operation of the respective interface connection protocol (e.g., addressing information, datagram identification information, datagram length information, protocol versioning information, datagram expiration information, etc.). On the other hand, command information may refer to protocol-specific information descriptive of, and pertinent to carrying out, a given issued command (e.g., an operation code uniquely identifying the given issued command, a logical block address specifying a first logical block location on the storage system whereto data may be written or wherefrom data may be read, a mode code uniquely identifying and enabling (or disabling) certain modes, features, and/or versions of the given issued command, etc.). Moreover, data information may generally refer to any format of content (e.g., images, text, video, audio, machine code, any other data file format, or any combination thereof) that may be submitted to or retrieved from the storage system. Data information may further include any metadata descriptive of the transferred content.

In one embodiment of the invention, any given connection protocol datagram may be implemented as a sequence of bytes (i.e., ordered groups of binary digits or bits). Aside from the assignment of certain bits, in any given connection protocol datagram, to relay the above-described header information, command information, and/or data information, any given interface connection protocol may designate one or more bits in their respective connection protocol datagrams as reserved bit(s). A reserved bit, in any given connection protocol datagram, may represent a bit that may currently be unused or unassigned by the respective interface connection protocol. Accordingly, by repurposing one or more reserved bits of a given connection protocol datagram, embodiments of the invention may embed or incorporate reduction-pertinent metadata (described above) at any granularity permissible by the employed interface connection protocol.

In one embodiment of the invention, a forward pipeline originating from any single host application (120A-120N) and terminating at any single interface device (128A-128N), while traversing through the reduction metadata detector (122) and the host operating system (124), may be referred hereinafter as an IO path (130). Similarly, an IO path (130) may also be used to reference a reverse pipeline, which may originate from any single interface device (128A-128N) and may terminate at any single host application (120A-120N), while at least traversing through the host operating system (124). Furthermore, an IO path (130) may represent a logical path through which any data (e.g., data files, data blocks, etc.) traverses, at least within an architecture of the host device (102), to be written to or to be read from the storage system.

While FIG. 1B shows a configuration of components, other host device (102) configurations may be used without departing from the scope of the invention.

Figure 2:
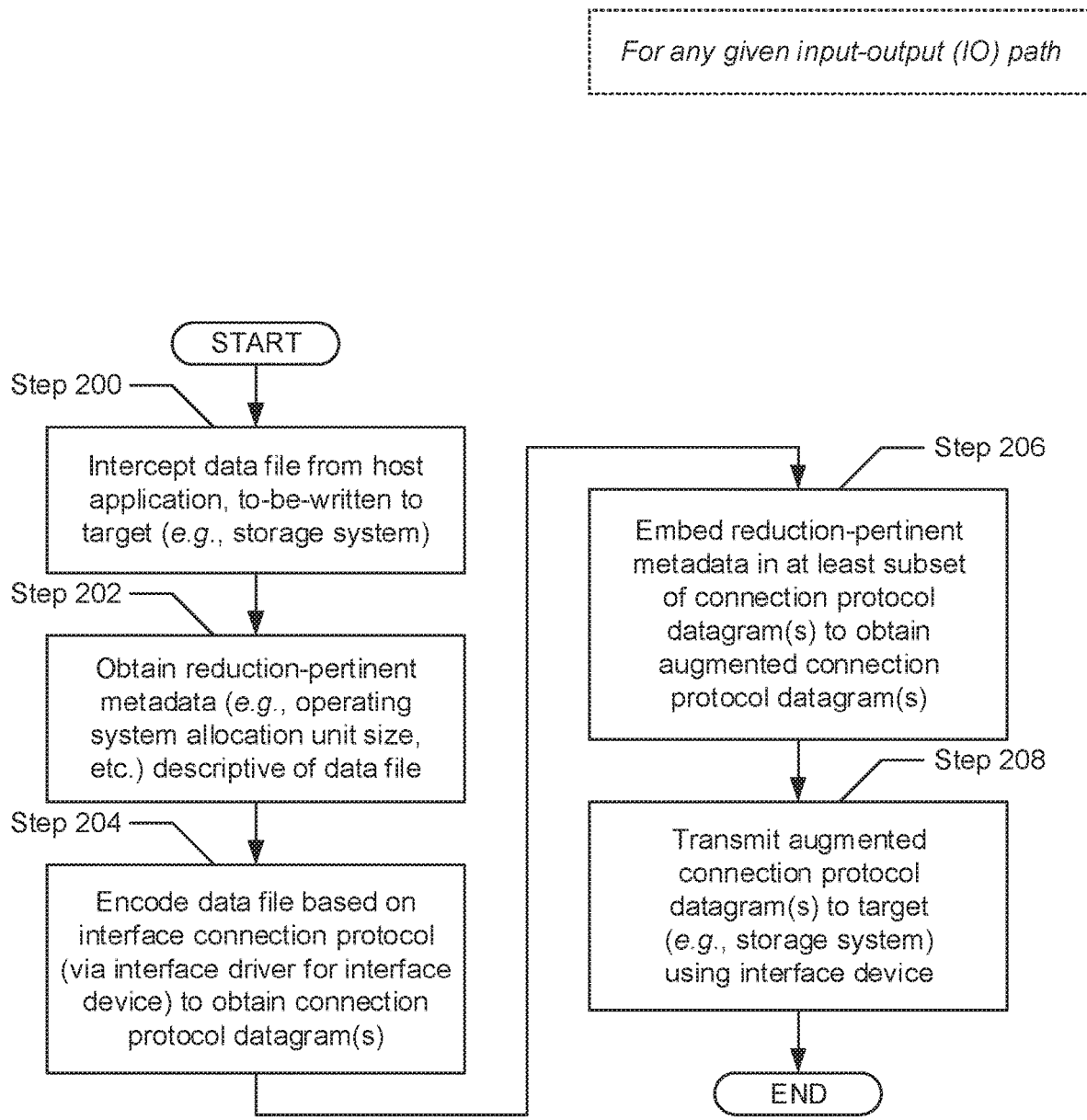
FIG. 2 shows a flowchart describing a method for sharing data reduction metadata with storage systems in accordance with one or more embodiments of the invention.

FIG. 2 shows a flowchart describing a method for sharing data reduction metadata with storage systems in accordance with one or more embodiments of the invention. The various steps outlined below may be performed by the reduction metadata detector, working at least in part with the host operating system, on the host device (see e.g., FIG. 1B). Further, while the various steps in the flowchart are presented and described sequentially, one of ordinary skill will appreciate that some or all steps may be executed in different orders, may be combined or omitted, and some or all steps may be executed in parallel.

Turning to FIG. 2, in Step 200, data (e.g., a data file, one or more data blocks, etc.) is intercepted. In one embodiment of the invention, the data may represent data intended to be written to (or stored on) the storage system. Further, the data may be traveling along a given IO path (described above) (see e.g., FIG. 1B), and may have originated from a given host application executing on the host device.

In Step 202, reduction-pertinent metadata (described above) (see e.g., FIG. 1B), respective to the data (intercepted in Step 200), is obtained. Thereafter, in Step 204, the data (intercepted in Step 200) is encoded. In one embodiment of the invention, encoding the data may conform to a given interface connection protocol (described above) (see e.g., FIG. 1B), and may be facilitated through the invocation of a device driver respective to a given interface device installed on the host device, where the given interface device may employ the given interface connection protocol. Furthermore, encoding the data may result in obtaining one or more connection protocol datagrams (described above) (see e.g., FIG. 1B), where at least a subset, if not each, of the connection protocol datagram(s) may encapsulate at least a portion of the data.

In Step 206, the reduction-pertinent metadata (obtained in Step 202) is embedded (or incorporated) into at least a subset, if not each, of the connection protocol datagram(s) (obtained in Step 204). More specifically, in one embodiment of the invention, reserved bits (described above) (see e.g., FIG. 1B) throughout the connection protocol datagram(s) may be repurposed to harbor the reduction-pertinent metadata. Further, by embedding or incorporating the reduction-pertinent metadata into the connection protocol datagram(s), one or more augmented connection protocol datagrams may be obtained.

In Step 208, the augmented connection protocol datagram(s) (obtained in Step 206) is/are transmitted. Particularly, in one embodiment of the invention, the augmented connection protocol datagram(s) may egress the host device from the given interface device, and traverse a physical connection, towards the storage system.

In one embodiment of the invention, upon receiving the augmented connection protocol datagram(s), the storage system may include functionality to decode the augmented connection protocol datagram(s) based on a prescribed specification of the given interface connection protocol employed during the data transfer. Decoding of the augmented connection protocol datagram(s) may result in obtaining the data (intended to be written to or stored on the storage system) and the reduction-pertinent metadata (embedded in Step 206). The storage system may subsequently process the data based on the reduction-pertinent metadata prior to storing the resulting processed data across one or more physical storage devices residing thereon. Processing of the data may entail improved applicability of data reduction (e.g., data deduplication and/or data compression) algorithms to the data based on interpretation of the reduction-pertinent metadata.

Regarding improved applicability of data reduction algorithms, by way of an example, consider a scenario where the storage system, without the benefit of embodiments of the invention, receives and decodes a set of connection protocol datagram(s) to obtain data. Note that, without embodiments of the invention, a set of augmented connection protocol datagram(s) may not be submitted to the storage system and, accordingly, neither may any reduction-pertinent metadata shared therewith. Further developing this scenario, assume the storage system, upon obtaining the data, proceeds to process the data by way of data deduplication. Unbeknownst to the storage system, however, data blocks of the data may be shifted by a certain offset based on fixed-block architecture (e.g., operating system allocation unit size (described above) (see e.g., FIG. 1B)) that had been applied to the data at the host device. Following the processing, processed data—e.g., deduplicated data—may be obtained. However, because of the aforementioned unknown shift of the data blocks of the data by the certain offset, the processed data may not be as devoid of redundancies as it can be.

That is, in one embodiment of the invention, a performance of any employed data deduplication algorithm may substantively rely on a match frequency of redundant data chunks or segments dispersed throughout the data. The higher the match frequency, the more redundant data chunks may be identified and removed throughout the data, which translates to a greater efficiency and/or higher performance of the employed data deduplication algorithm. In turn, match frequency (i.e., identification of these redundant data chunks) may depend on two factors: a configured chunk size defining a bit- or byte-length of the redundant data chunks; and a data offset defining a starting bit- or byte-displacement of the data from a reference base position (e.g., a start-of-file marker) within the logical container (e.g., data file) of the data.

Accordingly, returning to the above-described scenario, due to a data offset unbeknownst to the storage system, identification (and thus, the match frequency) of redundant data chunks may be skewed, leading to poor data deduplication, and overall storage system, performance. However, with incorporation of embodiments of the invention, the above-mentioned data offset, associated with the data, may be communicated to the storage system as at least a portion of the reduction-pertinent metadata that may augment the set of connection protocol datagram(s). Further, having the benefit of the data offset, the storage system may shift the data by the identified data offset prior to executing the data deduplication algorithm. As a result, a higher match frequency, pertinent to data deduplication, may be obtained, thereby leading to higher data deduplication, and overall storage system, performance.

Figure 3:
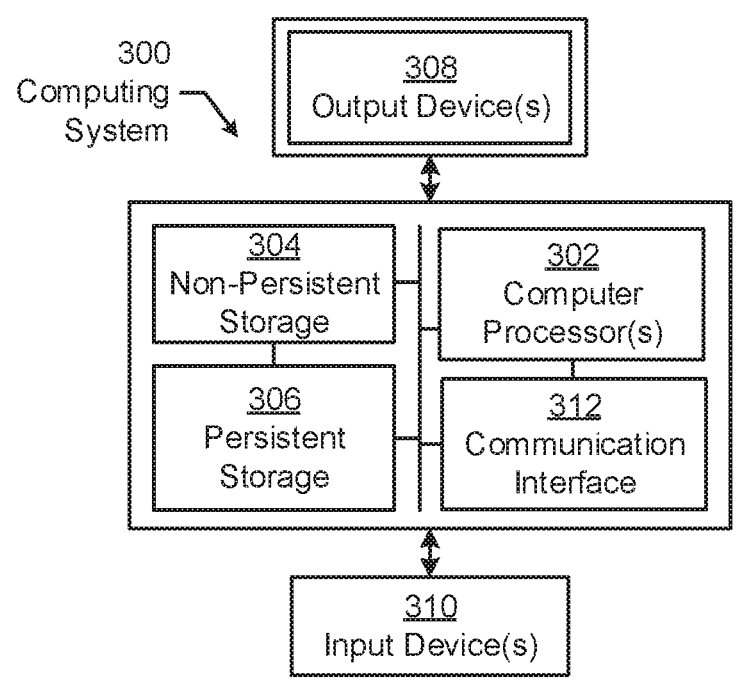
FIG. 3 shows an exemplary computing system in accordance with one or more embodiments of the invention.

FIG. 3 shows an exemplary computing system in accordance with one or more embodiments of the invention. The computing system (300) may include one or more computer processors (302), non-persistent storage (304) (e.g., volatile memory, such as random access memory (RAM), cache memory), persistent storage (306) (e.g., a hard disk, an optical drive such as a compact disk (CD) drive or digital versatile disk (DVD) drive, a flash memory, etc.), a communication interface (312) (e.g., Bluetooth interface, infrared interface, network interface, optical interface, etc.), input devices (310), output devices (308), and numerous other elements (not shown) and functionalities. Each of these components is described below.

In one embodiment of the invention, the computer processor(s) (302) may be an integrated circuit for processing instructions. For example, the computer processor(s) may be one or more cores or micro-cores of a central processing unit (CPU) and/or a graphics processing unit (GPU). The computing system (300) may also include one or more input devices (310), such as a touchscreen, keyboard, mouse, microphone, touchpad, electronic pen, or any other type of input device. Further, the communication interface (312) may include an integrated circuit for connecting the computing system (300) to a network (not shown) (e.g., a local area network (LAN), a wide area network (WAN) such as the Internet, mobile network, or any other type of network) and/or to another device, such as another computing device.

In one embodiment of the invention, the computing system (300) may include one or more output devices (308), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (302), non-persistent storage (304), and persistent storage (306). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for data transfer, comprising:
intercepting data intended to be stored on a storage system;
obtaining reduction-pertinent metadata for the data, wherein:
the reduction pertinent-metadata comprises an operating system allocation unit size, and
the data is represented across a set of data blocks each spanning the operating system allocation unit size;
encoding the data, based on an interface connection protocol, to obtain a set of connection protocol datagrams;
incorporating, into at least a subset of the set of connection protocol datagrams, the reduction-pertinent metadata to obtain a set of augmented connection protocol datagrams; and
transmitting the set of augmented connection protocol datagrams to the storage system, wherein the storage system uses the operating system allocation unit size of the reduction-pertinent metadata in the augmented connection protocol datagram to increase a match frequency of matches between the data and a plurality of data chunks stored in the storage system when performing data reduction.

2. The method of claim 1, wherein the interface connection protocol is one selected from a group consisting of a small computer system interface (SCSI) protocol and a fibre-channel protocol (FCP).

3. The method of claim 1, wherein incorporating the reduction-pertinent metadata comprises repurposing reserved bits across the at least subset of the set of connection protocol datagrams to store the reduction-pertinent metadata therein.

4. The method of claim 1, further comprising:
receiving, by the storage system, the set of augmented connection protocol datagrams;
decoding the set of augmented connection protocol datagrams, based on the interface connection protocol, to obtain the data and the reduction-pertinent metadata;
performing the data reduction by processing the data using a data reduction algorithm, and the reduction-pertinent metadata, to obtain processed data; and
storing the processed data across a set of storage devices on the storage system.

5. The method of claim 4, wherein the data reduction algorithm comprises a data deduplication algorithm.

6. The method of claim 4, wherein the data reduction algorithm comprises a data compression algorithm.

7. A non-transitory computer readable medium (CRM) comprising computer readable program code, which when executed by a computer processor, enables the computer processor to:
intercept data intended to be stored on a storage system;
obtain reduction-pertinent metadata for the data, wherein:
the reduction pertinent-metadata comprises an operating system allocation unit size, and
the data is represented across a set of data blocks each spanning the operating system allocation unit size;
encode the data, based on an interface connection protocol, to obtain a set of connection protocol datagrams;
incorporate, into at least a subset of the set of connection protocol datagrams, the reduction-pertinent metadata to obtain a set of augmented connection protocol datagrams; and
transmit the set of augmented connection protocol datagrams to the storage system,
wherein the storage system uses the operating system allocation unit size of the reduction-pertinent metadata in the augmented connection protocol datagram to increase a match frequency of matches between the data and a plurality of data chunks stored in the storage system when performing data reduction.

8. The non-transitory CRM of claim 7, wherein the interface connection protocol is one selected from a group consisting of a small computer system interface (SCSI) protocol and a fibre-channel protocol (FCP).

9. The non-transitory CRM of claim 7, wherein incorporating the reduction-pertinent metadata comprises repurposing reserved bits across the at least subset of the set of connection protocol datagrams to store the reduction-pertinent metadata therein.

10. The non-transitory CRM of claim 7, comprising computer readable program code, which when executed by the computer processor, enables the computer processor to:
receive, by the storage system, the set of augmented connection protocol datagrams;
decode the set of augmented connection protocol datagrams, based on the interface connection protocol, to obtain the data and the reduction-pertinent metadata;
perform the data reduction by processing the data using a data reduction algorithm and the reduction-pertinent metadata, to obtain processed data; and
store the processed data across a set of storage devices on the storage system.

11. The non-transitory CRM of claim 10, wherein the data reduction algorithm comprises a data deduplication algorithm.

12. The non-transitory CRM of claim 10, wherein the data reduction algorithm comprises a data compression algorithm.

13. A system, comprising:
a host device comprising a computer processor;
a reduction metadata detector and a host operating system executing on the computer processor,
wherein the reduction metadata detector, in concert with the host operating system at least in part, is programmed to:
intercept data intended to be consolidated;
obtain reduction-pertinent metadata for the data, wherein:
the reduction pertinent-metadata comprises an operating system allocation unit size, and
the data is represented across a set of data blocks each spanning the operating system allocation unit size;
encode the data, based on an interface connection protocol, to obtain a set of connection protocol datagrams;
incorporate, into at least a subset of the set of connection protocol datagrams, the reduction-pertinent metadata to obtain a set of augmented connection protocol datagrams; and
transmit the set of augmented connection protocol datagrams for consolidation; and
a storage system operatively connected to the host device and configured to use the operating system allocation unit size of the reduction-pertinent metadata in the augmented connection protocol datagram to increase a match frequency of matches between the data and a plurality of data chunks stored in the storage system when performing data reduction.

14. The system of claim 13, wherein the host device further comprises an interface device operatively connected to the computer processor, wherein the interface device operatively connects the host device to the storage system.

15. The system of claim 14, wherein the interface device is a host bus adapter (HBA).

* * * * *